UNITED STATES PATENT OFFICE.

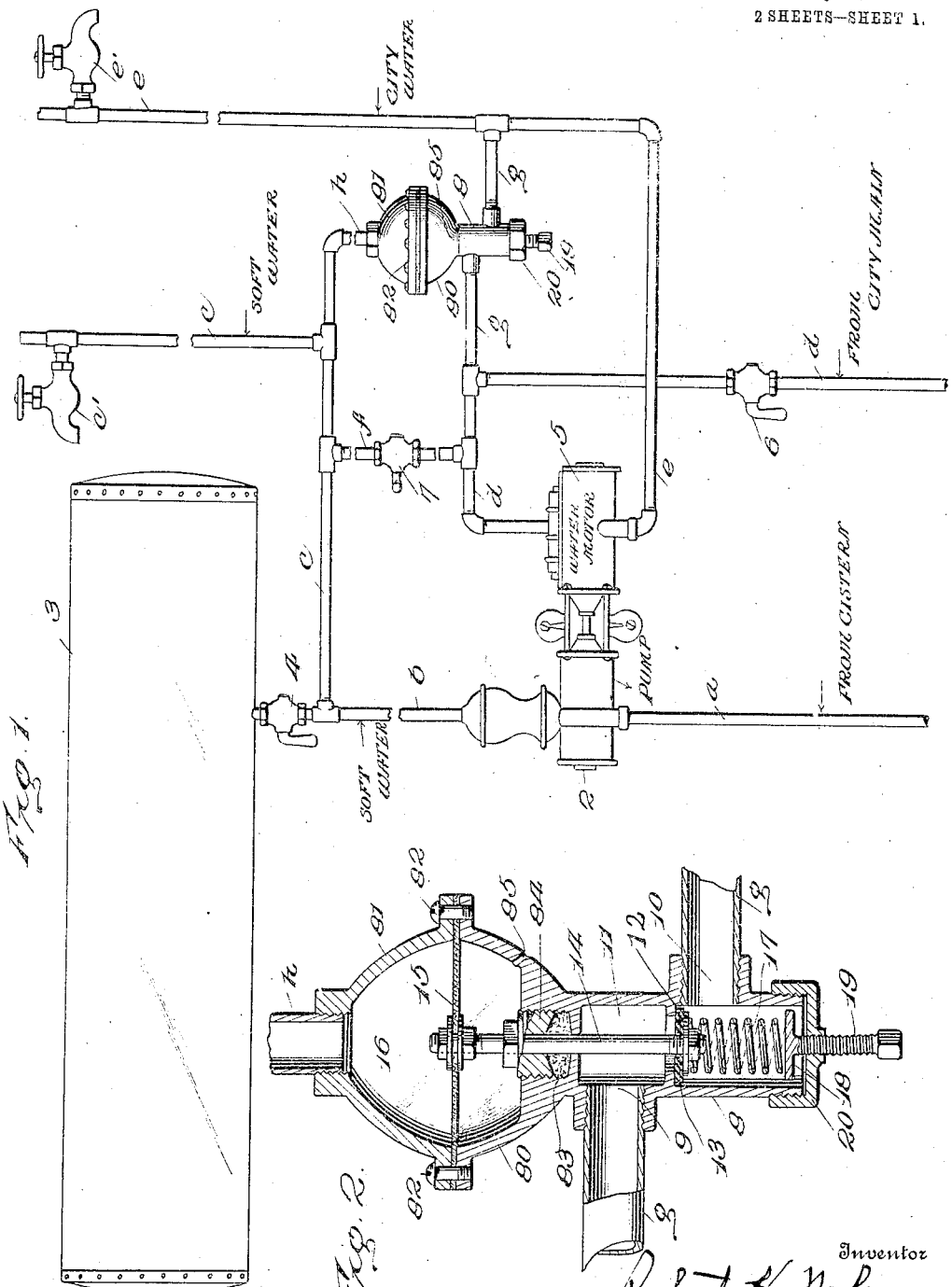

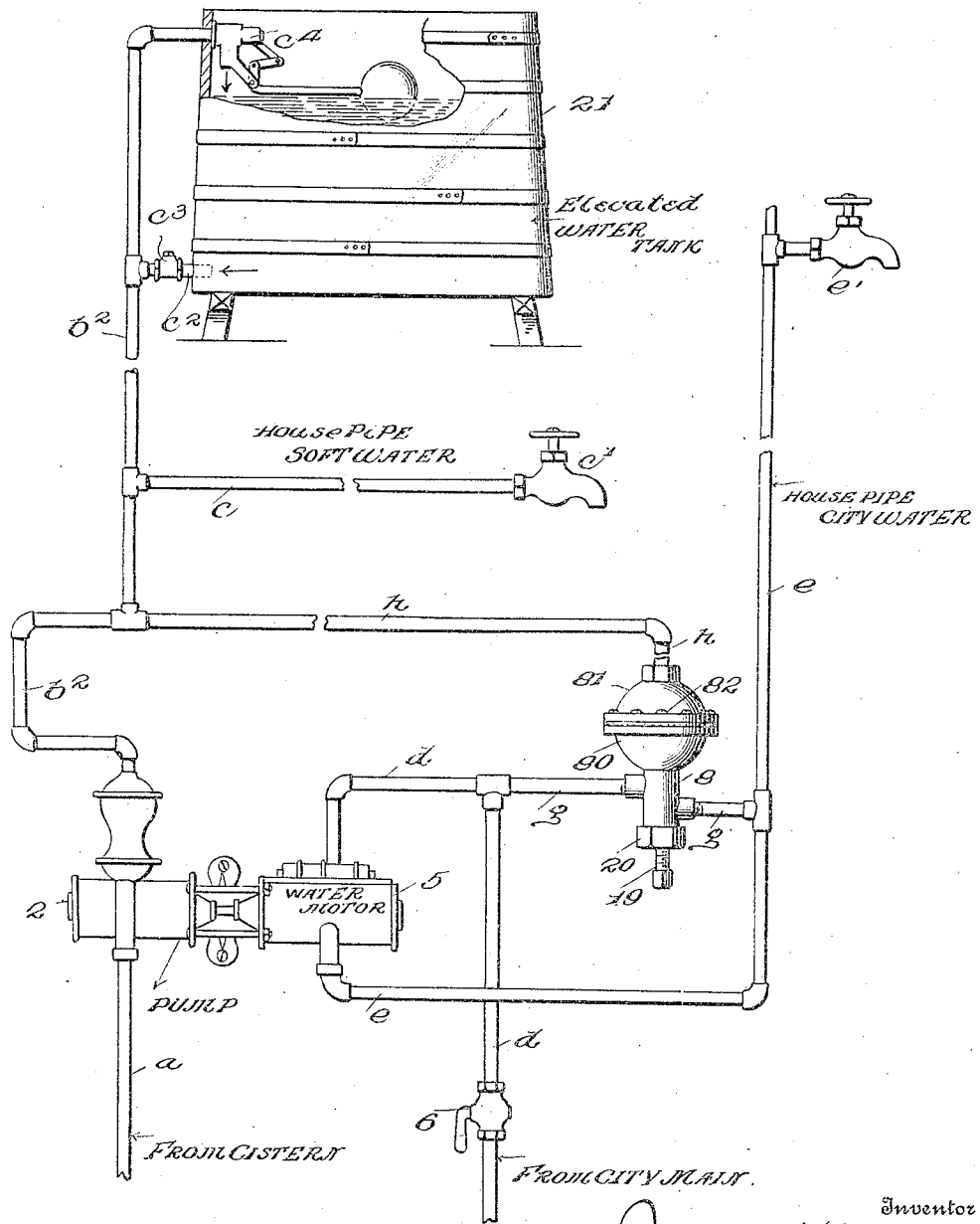

ROBERT H. NELSON, OF DIXON, ILLINOIS.

WATER-SUPPLY SYSTEM.

No. 920,774.  Specification of Letters Patent.  Patented May 4, 1909.

Application filed April 10, 1908. Serial No. 426,400.

*To all whom it may concern:*

Be it known that I, ROBERT H. NELSON, a citizen of the United States, residing at Dixon, Lee county, Illinois, have invented certain new and useful Improvements in Water-Supply Systems; and I do hereby declare the following to be a full, clear, and exact description of the invention, such as will enable others skilled in the art to which it appertains to make and use the same.

This invention relates to certain improvements in water supply systems; and relates more particularly to means for automatically controlling water elevating mechanism in water supply systems for houses or wherever adapted to supply water at distant points; and the objects and nature of my invention will be readily understood by those skilled in the art in the light of the following explanation of the accompanying drawings illustrating what I consider my preferred embodiment from among other arrangements and constructions within the spirit and scope of my invention.

An object of the invention is to provide a water supply system adapted to furnish water from different sources, such as from city service pipes or mains and from cisterns or other sources of water not under pressure, and wherein the pressure of the service water is utilized to actuate a pump or the like for raising or forcing the cistern water, in connection with means for automatically stopping and starting the action of the pump as the pressure of the cistern water forced by the pump reaches or falls below a certain approximately predetermined point.

A further object of the invention is to provide a house or local water supply system comprising service pipes for water from city mains or other source of water under pressure, and a tank or reservoir to receive water from a cistern or other source of water not under pressure, a pump for forcing the cistern, or other water, into said tank, having actuating means included in said city main water service pipes and driven by the pressure of the water therein, and pressure actuated means controlled by the difference in pressure between the water in said tank or reservoir and the water in said city main water pipes, for causing the flow of said city water through said pump actuating means when the pressure in said tank falls below a certain point, and for shunting the flow of city main water from said pump actuating means and directly into said city main water service pipe systems when the pressure in said tank is at or above the desired point.

The invention consists in certain novel features in construction and in combinations or arrangements of parts as more fully and particularly described and set forth hereinafter.

In the accompanying drawings:—Figure 1, is a somewhat diagrammatical view illustrating my water supply system. Fig. 2, is a longitudinal section, on an enlarged scale, of the pressure regulating or controlling valve. Fig. 3, is a diagrammatical view showing the system arranged to lift water to an elevated tank or reservoir from which it is supplied by gravity to the points desired.

Referring to Figs. 1 and 2, of the drawings, *a* is the water supply pipe from a cistern, or other source of rain or what is commonly termed "soft" water, or any other source of water not under pressure or water requiring means for lifting or forcing the same to the location or point desired for use. This water supply pipe, *a*, extends to and supplies a pump 2, of any suitable type or construction designed and arranged to lift the water from the cistern or other source and force or drive the same under pressure to supply a house pipe system or other pipe or system for use. In the example shown, the pump forces the cistern water through pipe *b*, into a closed pressure or compression tank 3. The pump forces such a quantity of water under pressure into this tank until the air in the tank is thereby compressed to the desired extent to force or lift the water from the tank to the desired point for service. For instance, I show the water service pipe *c*, extending from the pressure tank 3, to supply faucets variously located in a house or elsewhere, or to carry and deliver the soft or rain water wherever desired. This service pipe *c*, can be coupled with the pressure tank in any suitable manner or by any suitable means, preferably so as to draw the water from the lower portion of the interior of the tank. In the specific example illustrated, merely for convenience, I show the water receiving end of the service pipe *c*, coupled by a T into the upper end portion of the pipe *b*, from the pump and supplying water to and opening into the tank. If so desired, a cut-off valve or cock 4, can be arranged in pipe b, by which pipes b and c, can be cut-off from the tank if for any reason such action be necessary or desirable.

d, is a water supply pipe connected with any suitable source of water under pressure, such for instance as a city main or other source of city water supply under pressure. This supply or connecting pipe d, extends into the house and is connected with the water inlet port of a water motor 5, of any suitable or desirable type or construction. This motor is connected by suitable means to drive the pump 2. The water motor is constructed for and is operated by the service pressure of the city water delivered into the motor through the supply pipe d, and hence the cistern water pump 2, is operated by the city water pressure.

A service pipe system is provided in the house or elsewhere to deliver the city water at the service pressure to faucets, flush tanks or other outlets and for garden or lawn purposes. This city water house service pipe system is indicated by the pipe e, which is connected with the waste or exhaust port of the water motor 5, so that the service pipe or system e, is connected with the supply pipe d, through the water motor, which in effect is included in the water supply connected between the street main and the house service system e.

6, is a cut off valve which can be located in the supply pipe d, between the motor and street main for obvious purposes. If so desired, a normally closed direct or cross pipe connection f, can be established between the city water supply pipe d, and the cistern water house supply pipe system e. This direct or cross connection f, is normally closed by cut-off valve 7, which can be opened if for any abnormal reason it becomes desirable to supply the pipe system e, with city water, in which event valve 4, would be closed and the motor and pump would remain inactive.

A direct or shunt pipe connection g, is established between the city water supply pipe d, and the house service pipe or system e, independently of the motor 5, and whereby the motor can be shunted, as it were, out of the system and the city water supplied direct to pipe system e, without passing through or operating the motor. In this direct or shunt water connection g is included the casing of an automatic differential or pressure operated controlling valve, in Figs. 1 and 3, generally indicated by the reference numeral 8. The pressure chamber of this valve is in direct open communication with the cistern water house supply pipe or system e, through the medium of a pipe h, from pipe c, and opening into said chamber. The valve casing has city water inlet opening 9, and outlet opening 10, into which the sections of the pipe g, are secured. The casing is formed with a longitudinal or vertical water passage 11, extending down from inlet port 9, to outlet port 10, and intermediate said ports, the casing is formed with an internal annular valve seat 12. A vertically movable reciprocating valve 13, is arranged within said casing below said seat 12, and adapted to move up against said seat and tightly close the passage 11, against flow of water through the casing, consequently closing or cutting off the direct or shunt pipe connection g. This valve is provided with valve stem 14, rigid therewith and extending upwardly therefrom longitudinally of the casing and at its upper end fixed to the central portion of a flexible diaphragm 15, forming the floor or bottom wall of the pressure chamber 16, into which pipe h, opens and which chamber receives the cistern water from tank 3, and wherein the cistern water is under the same pressure as in the cistern water house service pipe c. It will thus be noted that the pressure of the cistern water in the house service pipe c, or in pressure supply tank 3, is exerted against diaphragm 15, in a direction to tend to force valve 13, from its seat and permit flow of city service water through cut-off or direct connection g, and means are provided whereby when the cistern water pressure rises to a certain point, such pressure will be sufficient to depress diaphragm 15, and open valve 13, and thereby cause the flow of city service water direct to city water house pipe e, and not through the water motor, hence preventing operation of the motor and pump simply because the water will follow the course of least resistance through the cut-off or shunt g, rather than through the motor.

Suitable means can be provided to normally and yieldingly hold the valve 13, to its seat under a certain predetermined pressure. Of course the pressure of the city water might be utilized for this purpose, but as at present advised by experience, I prefer to employ a spring such for instance, as coiled expansive spring, 17, arranged in the lower end of the passage 11, of the valve casing and compressed between the under side of valve 13, and a head or abutment 18, on the upper end of adjusting screw 19, adjustable through and carried by cap 20, screwed on and closing the lower end of the casing.

Through the medium of screw 19, the tension of the spring on the valve can be adjusted to the desired pressure to determine the pressure of the cistern water in the tank 3, necessary to open the valve 13. The object is to maintain the water in tank 3, up to a certain pressure, that is the pressure necessary to properly supply water through pipe c, and when, through the medium of pump 2, the desired quantity or pressure of water has been reached in tank 3, to open valve 13, city water flowing through pipes d and e, will not cause operation of the water motor but will be shunted around the motor by flowing through direct or cut-off pipe connection g. If the desired cistern water in tank 3, should, (by use in the house through cistern water house faucet c', for instance), fall below the predetermined quantity or pressure, the spring 17, will overcome the pressure of the cistern water against diaphragm 15, and thereby close valve 13. If while valve 13, is thus held closed, the city water house faucet e', should be opened, or if by any other means, water should be caused to flow through city water house pipe e, the water motor will be immediately started in operation as the city water must pass through the motor. The cistern water pump will hence force cistern water into tank 3, while water runs through pipe e, and until the pressure in tank 3, and pipe c, is sufficient to overcome spring 17, and again open valve 13.

In Fig. 3, I show an open elevated cistern water supply tank 21, instead of the closed compression or pressure tank, and the pump 2, elevates the cistern water into said elevated tank through pipe $b^2$, while the house service pipe c, is supplied from said elevated tank by gravity. The pipe $b^2$, is shown discharging into the top of the tank, and the water discharge into the tank can be controlled, or closed and opened, by any suitable float operated valve $c^4$, such as a ball cock check. The soft water house pipe c, can be supplied from the bottom of tank 21, through pipe length $c^2$, and a section of pipe $b^2$; the pipe c, extending from pipe $b^2$, at a point below pipe $c^2$. Pipe $c^2$, can be provided with an outwardly opening check valve $c^3$, to prevent back flow from pipe $b^2$, through pipe $c^2$. When the tank 21, has been filled to the desired level, the float closes the valve $c^4$, and the pressure in pipe $b^2$, being communicated through pipe h, to the pressure chamber of the controlling valve causes the opening of valve 13, and results in stopping the operation of the pump. When sufficient water has been drawn from tank 21, to so reduce the pressure as to permit spring 17, to close valve 13, the motor will automatically supply water to the tank so long as water flows through pipe e.

In the arrangement of Fig. 3, the open tank 21, can be arranged in the attic if so desired, and serves to supply cistern or "soft" water in the house which is particularly desirable where the city water supplied in the house is what is commonly called "hard". I also find that the controlling or pressure valve prevents pounding, jar or hammering of the water in the house pipes and of the pump and motor while in action, because, I presume, of the cushioning effect of the diaphragm and the spring 17, acting thereon.

The controlling pressure valve can be utilized for automatically controlling the waste or overflow pipes of elevated tanks and can be employed in other connections than in the specific system herein described. The pressure of the water driven by pump 2, can be applied to the valve 13, in a direction tending to open the same, by means other than the diaphragm shown, although as at present advised, I prefer to employ the diaphragm. The controlling pressure valve, shown in the specific example illustrated, comprises a depending cylindrical or tube-like casing 8, having the inlet and outlet openings 9 and 10, and forming the longitudinal internal fluid passage 11, preferably closed at the upper end. This vertical or reduced casing 8, can be formed integral with an outwardly flared or bell-shaped flanged upper end 80, forming the lower half of the diaphragm shell or casing, the upper half of which is formed by the bell or flared flanged section 81, having top inlet into which pipe h, is screwed or otherwise secured. The surrounding edge portion of the diaphragm is interposed between the edge flanges of the sections 80, 81, so that the diaphragm spans the interior of the chamber formed by said shells and forms a partition completely shutting off the pressure chamber 16, from the space below the diaphragm. The two shells are fixed together and against the diaphragm to form a water tight joint by screws 82, or other suitable means. The fluid passage 11, is separated from the space in shell section 80, by a transverse wall perforated for the passage of valve stem 14. To prevent leakage of fluid from passage 11, into the shell below the diaphragm, I have provided packing 83, around said stem in a socket formed in and opening through the top of said transverse wall. I can internally screw thread this socket to receive a gland or nut 84, by which the packing 83, can be tightened around the valve stem. I also usually provide means whereby the space in the shell and below the diaphragm is open to the atmosphere, for instance by vent or perforation 85, through shell section 80. If water should leak around the stem, it will be drained from the shell through said vent, and hence the pressure below the diaphragm will remain at that of the atmosphere and will not interfere with the free and proper operation of the diaphragm. It will be observed that the arrangement of pipes d, e, and g, with respect to the water motor and controlling valve, is such that the water pressure at the exhaust of the motor is practically the same as the water pressure at the inlet of said motor, whether the motor is in operation or at rest. By this arrangement, leakage of water motor is reduced to the minimum.

It is evident that various modifications might be resorted to and that the system of pipes shown might be otherwise arranged, without departing from the spirit and scope of my invention and hence I do not wish to limit myself to the exact constructions shown.

What I claim is:—

1. In a water supply system, in combination, a house service water system, a pump for raising water thereto, a water motor for actuating said pump, a pipe system for supplying water under pressure, said motor being included in said pipe system and driven by said water under pressure, a pressure actuated controlling valve yieldingly held in normal closed position directing the flow of water under pressure through said motor to drive the same, and means whereby excessive pressure in said house service system will cause opening movement of said valve to shunt the actuating flow of water under pressure from said motor to prevent operation thereof, substantially as described.

2. In a duplex water supply system, in combination, a pipe system for serving water, a pump for supplying water thereto, a water motor for actuating said pump, a pipe for serving city-service or other water under pressure, a supply connection, in which said motor is included, for said last mentioned pipe, a direct supply connection for said last mentioned pipe excluding the motor, and means subjected to and controlled by the water pressure in said pipe system for closing and opening said direct supply connection to said pipe for serving city-service or other water under pressure, substantially as described.

3. A water supply system comprising a service pipe for soft or other water, means for supplying water to such pipe, an actuating water motor therefor, a supply pipe connection for water under pressure and in which said motor is included for driving the same by the flow of said water therethrough, and a pressure controlled valve controlling an outlet from said connection in advance of said motor, whereby the flow of said water under pressure can be deflected from the motor, said valve comprising means whereby said valve is normally and yieldingly held closing said outlet, and means subject to and operated by the pressure of the water in said service pipe for opening said valve, substantially as described.

4. A water supply system comprising a service pipe for soft or other water, means for supplying water thereto, a water motor for actuating the same, a service pipe for city or other water under pressure, a city water supply pipe, a pipe connection therefrom to said city water service pipe and in which said motor is included, a cut-off pipe connection from said supply pipe to said city water service pipe independent of said motor, and a controlling valve normally held under pressure closing said cut-off, and provided with opening means subject to and actuated by the water pressure in said soft water service pipe for opening said valve, substantially as described.

5. A duplex water supply system comprising a pipe system for serving soft or other water, pipe connections having a valved discharge for serving city-service or other water under pressure, means for supplying water to said pipe system provided with an actuating motor included in said pipe connections and adapted to be actuated by the flow therethrough of the water under pressure, an automatic pressure-actuated controlling valve included in said pipe connections for throwing said motor into or out of action when said valve discharge is open to set up flow of water under pressure through said connections by directing said flow through the motor or by permitting said flow independently of the motor, said controlling valve comprising movable means subject to the pressure in said pipe system and thereby determining the position of said valve to throw the motor into or out of action, substantially as described.

6. A water supply system comprising a service pipe system, a pump for supplying water thereto, a water motor for actuating said pump, a supply pipe connection for water under pressure for supplying water to said motor for actuating the same, a service pipe for receiving said water under pressure from the motor, a cut-off pipe connection between said supply connection and said last mentioned service pipe and independent of said motor, and a controlling valve comprising a casing forming a pressure chamber in open communication with said service pipe from said tank and closed from said cut-off, said casing having a passage included in said cut-off, a valve in said passage for closing the same, a spring yieldingly holding said valve closing said passage, and a movable member in said pressure chamber connected with said valve for opening the same when the water pressure in said chamber exceeds the tension of said spring.

In testimony whereof I affix my signature, in presence of two witnesses.

ROBERT H. NELSON.

Witnesses:
W. T. BRINK,
C. A. ROBBINS.